United States Patent
Xu et al.

(10) Patent No.: US 11,678,153 B2
(45) Date of Patent: Jun. 13, 2023

(54) INFORMATION TRANSMISSION AND RECEPTION METHOD AND APPARATUS

(71) Applicant: ZTE Corporation, Shenzhen (CN)

(72) Inventors: Hui Xu, Shenzhen (CN); Chen Lu, Shenzhen (CN); Xiangmo Zhao, Shenzhen (CN); Fei Hui, Shenzhen (CN); Zhongwei Ji, Shenzhen (CN); Jianfeng Ding, Shenzhen (CN); Xiaoquan Hua, Shenzhen (CN); Yaying Wang, Shenzhen (CN); Zijiang Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 234 days.

(21) Appl. No.: 16/764,864

(22) PCT Filed: Nov. 22, 2018

(86) PCT No.: PCT/CN2018/117039
§ 371 (c)(1),
(2) Date: May 17, 2020

(87) PCT Pub. No.: WO2019/184404
PCT Pub. Date: Oct. 3, 2019

(65) Prior Publication Data
US 2021/0006954 A1 Jan. 7, 2021

(30) Foreign Application Priority Data
Mar. 28, 2018 (CN) .......................... 201810267077.3

(51) Int. Cl.
*H04W 4/00* (2018.01)
*H04W 4/40* (2018.01)
(Continued)

(52) U.S. Cl.
CPC ............. *H04W 4/40* (2018.02); *H04W 24/08* (2013.01); *H04W 28/0205* (2013.01);
(Continued)

(58) Field of Classification Search
CPC ......... H04W 4/40; H04W 92/18; H04W 4/46; H04W 4/42; H04W 4/44; H04W 4/70; H04W 72/0493
See application file for complete search history.

(56) References Cited

U.S. PATENT DOCUMENTS

| 2018/0049097 A1* | 2/2018 | Chen ..................... H04L 1/1812 |
| 2019/0158993 A1* | 5/2019 | Kwon ................... H04L 5/0091 |

FOREIGN PATENT DOCUMENTS

| CN | 108260163 A | 7/2018 |
| WO | 2016148399 A1 | 9/2016 |
| WO | 2017159724 A1 | 9/2017 |

OTHER PUBLICATIONS

3GPP TSG-RAN WG2 Meeting #101, "Discussion on mode 3 resource allocation in PC5 CA", ZTE Corporation, Athens, Greece, Feb. 26-Mar. 2, 2018, R2-1801960.
(Continued)

*Primary Examiner* — Omoniyi Obayanju
(74) *Attorney, Agent, or Firm* — Cantor Colburn LLP (57) ABSTRACT

Provided are an information transmission and reception method and apparatus. The method includes: determining a transmission manner of a V2X service duplication to be transmitted; selecting a PC5 air interface carrier for transmitting the V2X service duplication according to a rule corresponding to the transmission manner; and transmitting the V2X service duplication on the selected PC5 air interface carrier.

18 Claims, 8 Drawing Sheets

(51) Int. Cl.
　　　　*H04W 24/08*　　　　(2009.01)
　　　　*H04W 28/02*　　　　(2009.01)
　　　　*H04W 64/00*　　　　(2009.01)
　　　　*H04W 92/10*　　　　(2009.01)
(52) U.S. Cl.
　　　　CPC ....... *H04W 28/0289* (2013.01); *H04W 64/00* (2013.01); *H04W 92/10* (2013.01)

(56) References Cited

OTHER PUBLICATIONS

International Search Report for corresponding application PCT/CN2018/117039 filed Nov. 22, 2018; dated Jan. 30, 2019.

\* cited by examiner

INFORMATION TRANSMISSION AND RECEPTION METHOD AND APPARATUS

CROSS-REFERENCE TO RELATED APPLICATION

The present disclosure is based upon and claims priority to Chinese Patent Application No. 201810267077.3, filed on Mar. 28, 2018, the entire contents of which are incorporated herein by reference.

TECHNICAL FIELD

The present disclosure relates, but is not limited to, the field of communications, and in particular to an information transmission and reception method and apparatus.

BACKGROUND

Figure 1:
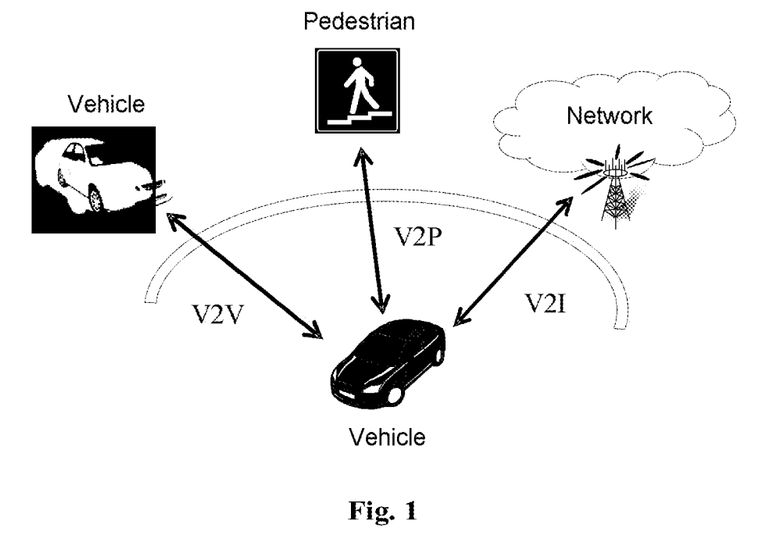
FIG. 1 is a schematic diagram of a V2X in the relevant art.

A Vehicle to everything (V2X) is to provide vehicle information via a sensor, a vehicle-mounted terminal and an electronic tag loaded on a vehicle. It uses a variety of communication technologies to implement interconnection and intercommunication of Vehicle to Vehicle (V2V), Vehicle to Pedestrian (V2P) and Vehicle to infrastructure (V2I), carries out effective utilization of information such as extraction and sharing on an information network platform, and effectively controls the vehicle and provides a comprehensive service. FIG. 1 illustrates a schematic diagram of a V2X.

In recent years, with the development of a novel mobile communication technology, there emerges a Long Term Evolution (LTE) technology in the world to address the research on a V2X-based communication application.

A Road Side Unit (RSU) may receive a vehicle request, guarantees that a vehicle is accessed to an Internet and has a gateway function. Besides, it also has data operation, storage and forwarding functions.

Presently, there are two V2X implementation technologies, namely a Dedicated Short Range Communication (DSRC) and the LTE. The DSRC is based on IEEE802.11P and IEEE1609 series of standards, in which the 802.11P is responsible for physical layer and Medium Access Control (MAC) technologies, and the 1609 is responsible for an upper level of specification. An LTE-based V2X technology is just at the beginning of discussion and there is no standard for it.

Figure 2:
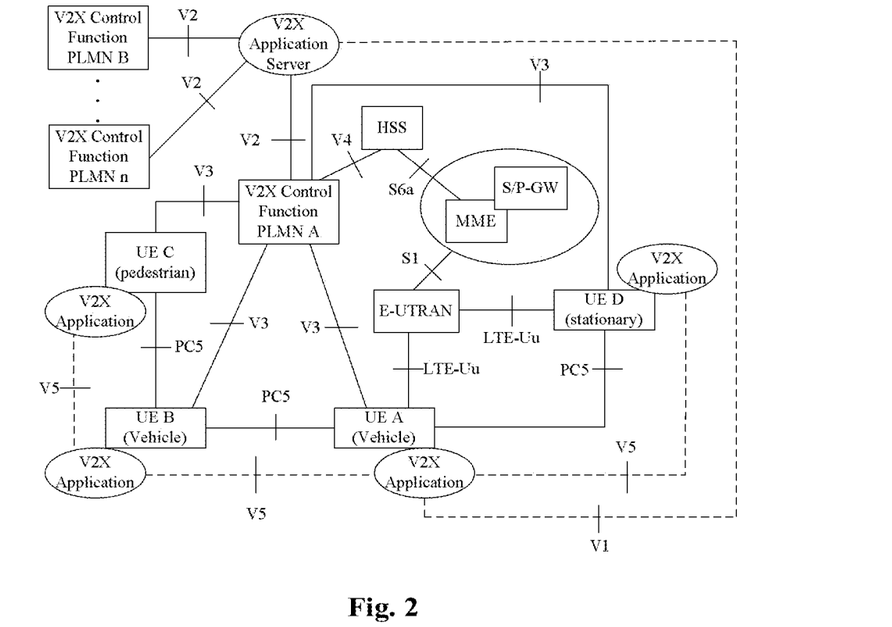
FIG. 2 is a system architecture diagram for transmitting a V2X service via a PC5 interface in the relevant art.

The LTE V2X technology that is being discussed by the 3rd Generation Partnership Project (3GPP) at present includes that: the RSU may be implemented via static User Equipment (UE) or eNB, and the V2V/V2I/V2P may be implemented via a PC5 interface or a Uu interface. The PC5 interface refers to a Device-to-Device (D2D) air interface and the Uu interface is a UE-to-eNB air interface. A system architecture for transmitting a V2X service via the PC5 interface is as shown in FIG. 2.

Among LTE V2X topics that are being researched by the 3GPP, for a manner in which the UE selects a resource independently (a mode 4), the UE uses a sensing manner to select a required PC5 interface to transmit the resource; and in case of HO-Handover, Radio Link Failure (RLF), resource pool change and other conditions, an exceptional resource pool may be used. Generally, a Pedestrian (P) in the V2P has no PC5 reception capability, that is, it cannot select a resource by sensing.

The V2X information is security-related information and is generally not allowed to be abandoned. In case of network congestion, it is necessary to select a corresponding radio transmission parameter for different congestion degrees. In view of this, a Channel Busy Ratio (CBR) is used in the 3GPP to measure a congestion degree of a channel. The CBR is defined as a proportion that sub-channel energy in a resource pool exceeds a threshold value within a period of time (it is often 100 ms). The sub-channel energy uses a Side link-Received Signal Strength Indication (S-RSSI) identifier and the threshold value is determined in advance. The UE measures and calculates the CBR according to a measurement configuration at a network side. For a given CBR, the network side provides a mapping table based on a priority of each V2X (by the use of a Proximity based Services (ProSe) Per-Packet Priority (PPPP)), each table includes the CBR (it is a range generally) and a corresponding radio resource parameter, and the UE selects the corresponding radio resource parameter according to the CBR.

For the ease of description, the V-UE refers to Vehicle-UE and the P-UE refers to Pedestrian-UE in the present disclosure.

In the 5th-generation (5G) project enhanced V2X (eV2X) in 3GPP, a higher requirement is put forward on reliability of the V2X service, and for example, the reliability is up to 99.999% at maximum. For this, duplication transmission is proposed to improve the reliability: a data packet on a Packet Data convergence Protocol (PDCP) sublayer of a transmitter is transmitted on two logical channels and transmitted to a PC5 air interface by using two subcarriers; and a receiver receives data packets (including an original and a duplication) on the two carriers, determines that the data packets are same data according to identifiers of the logical channels, and merges the data on the PDCP sublayer; and therefore, the reliability of the data transmitted on the PC5 is improved.

SUMMARY

The embodiments of the present disclosure provide an information transmission and reception method and apparatus.

According to an embodiment of the present disclosure, an information transmission method is provided, which includes that: a transmission manner of a V2X service duplication to be transmitted is determined; a PC5 air interface carrier for transmitting the V2X service duplication is selected according to a rule corresponding to the transmission manner; and the V2X service duplication is transmitted on the selected PC5 air interface carrier.

According to another embodiment of the present disclosure, an information reception method is provided, which includes that: one or more PC5 air interface carriers are monitored according to indication information and/or pre-configuration information of a transmitting UE; and according to a corresponding identifier of a V2X service duplication, the V2X service duplication transmitted by the transmitting UE is received on the PC5 interface carrier, wherein the V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier.

According to another embodiment of the present disclosure, an information transmission apparatus, which is applied to a transmitting UE, and includes: a determination module, configured to determine a transmission manner of a V2X service duplication to be transmitted is determined; a selection module, configured to select a PC5 air interface carrier for transmitting the V2X service duplication according to a rule corresponding to the transmission manner; and a first transmission module, configured to transmit the V2X service duplication on the selected PC5 air interface carrier.

According to another embodiment of the present disclosure, an information reception apparatus is provided, which is applied to a receiving UE and includes: a monitoring module, configured to monitor one or more PC5 air interface carriers according to indication information and/or pre-configuration information of a transmitting UE; a reception module, configured to receive, according to a corresponding identifier of a V2X service duplication, the V2X service duplication transmitted by the transmitting UE on the PC5 interface carrier, wherein the V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier.

According to a still another embodiment of the present disclosure, a storage medium is further provided: the storage medium stores a computer program; and the computer program is configured to execute, when running, the steps of any of the above-mentioned method embodiments.

According to a still another embodiment of the present disclosure, an electronic apparatus is further provided, which includes a memory and a processor; the memory stores a computer program and the processor is configured to run the computer program to execute the steps of any of the above-mentioned method embodiments.

Through the above embodiments of the present disclosure, a transmission manner of a V2X service duplication to be transmitted is determined; a PC5 air interface carrier for transmitting the V2X service duplication is selected according to a rule corresponding to the transmission manner; and the V2X service duplication is transmitted on the selected PC5 air interface carrier. In other words, the PC5 air interface carrier for transmitting the V2X service duplication is selected according to the rule corresponding to the transmission manner; and thus, a technical problem on how to select a PC5 carrier for transmitting a duplication is not proposed in the relevant art is solved, and the reliability of V2X service information of a PC5 interface is improved.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form limits to the present disclosure in the drawings.

DETAILED DESCRIPTION OF THE EMBODIMENTS

The present disclosure is described below in detail with reference to the accompanying drawings and in combination with the embodiments. It is be noted that the embodiments of the present disclosure and the characteristics of the embodiments may be combined with each other if there is no conflict.

It should be noted that, terminologies such as "first" and "second" in the specification, claims and accompanying drawings of the present disclosure are only used to distinguish similar objects, rather than to describe a special order or a precedence order.

Figure 3:
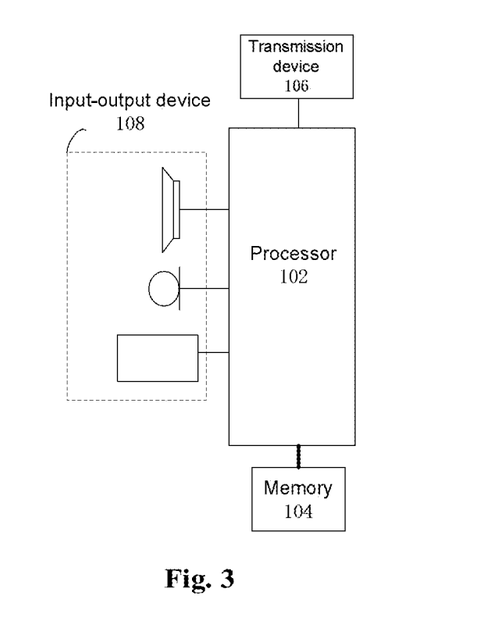
FIG. 3 is a block diagram of a hardware structure of a mobile terminal for an information transmission method according to an embodiment of the present disclosure.

The methods provided by the Embodiments of the present disclosure may be executed in a mobile terminal, a computer terminal or a similar computing device. For example, a method provided by an embodiment is executed on a mobile terminal. FIG. 3 is a block diagram of a hardware structure of a mobile terminal for an information transmission method according to an embodiment of the present disclosure. As shown in FIG. 3, the mobile terminal 10 may include one or more (only one is shown in FIG. 3) processors 102 (the processor 102 may include but not limited to a processing apparatus such as a Micro-programmed Control Unit (MCU) or a Field Programmable Gate Array (FPGA)) and a memory 104 for storing data. In an exemplary embodiment, the mobile terminal may further include a transmission device 106 having a communication function and an input-output device 108. Those of ordinary skill in the art may understand that the structure shown in FIG. 3 is merely for illustration, rather than a limit to the above structure of the mobile terminal. For example, the mobile terminal 10 may further include more or less components shown in FIG. 3, or have a configuration different from FIG. 3.

The memory 104 may be configured to store a computer program, such as a software program and a module of application software, and a computer program corresponding to an information transmission method in the embodiments of the present disclosure. The processor 102 executes, by running the computer program stored in the memory 104, various functional applications as well as data processing, that is, implements the above method. The memory 104 may include a high-speed Random Access Memory (RAM), and may further include a non-volatile memory such as one or more magnetic storage apparatuses, a flash memory or other non-volatile solid-state memories. In some examples, the memory 104 may further include a memory remotely disposed relative to the processor 102; and these remote memories may be connected to the mobile terminal 10 via a network. An example of the network includes but not limited to an Internet, an intranet, a local area network, a mobile communication network, and a combination thereof.

The transmission device 106 is configured to receive or transmit data via one network. A specific example of the network may include a wireless network provided by a communication provider of the mobile terminal 10. In an example, the transmission device 106 includes a Network Interface Controller (NIC) that may be connected to other network devices via an eNB to communicate with the Internet. In an example, the transmission device 106 may be a Radio Frequency (RF) module that is configured to communicate with the Internet via a wireless manner.

Figure 4:
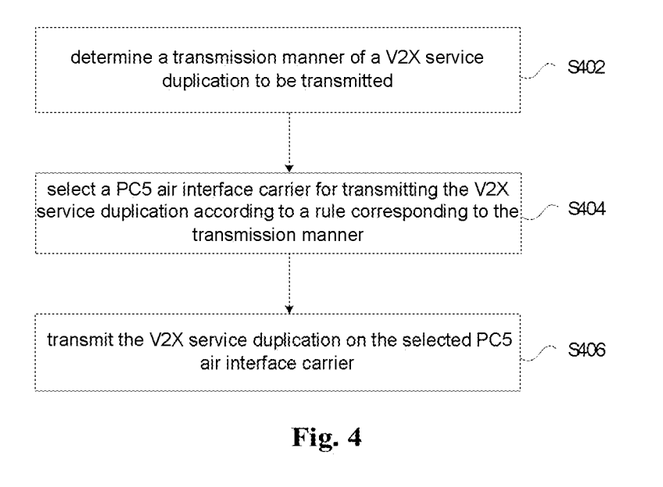
FIG. 4 is a flowchart of an information transmission method according to an embodiment of the present disclosure.

This embodiment provides an information transmission method. FIG. 4 is a flowchart of an information transmission method according to an embodiment of the present disclosure. As shown in FIG. 4, the process includes the following steps.

At S402, a transmission manner of a V2X service duplication to be transmitted is determined.

At S404, a PC5 air interface carrier for transmitting the V2X service duplication is selected according to a rule corresponding to the transmission manner.

At S406, the V2X service duplication is transmitted on the selected PC5 air interface carrier.

In an exemplary embodiment, an application scenario of the above information transmission method includes but not limited to: a V2X of an LTE network, a V2X of a 4G network, and a V2X of a 5G network. In this application scenario, a transmission manner of a V2X service duplication to be transmitted is determined; a PC5 air interface carrier for transmitting the V2X service duplication is selected according to a rule corresponding to the transmission manner; and the V2X service duplication is transmitted on the selected PC5 air interface carrier. In other words, the PC5 air interface carrier for transmitting the V2X service duplication is selected according to the rule corresponding to the transmission manner; and thus, a technical problem on how to select a PC5 carrier for transmitting a duplication is not proposed in the relevant art is solved, and the reliability of V2X service information of a PC5 interface is improved.

In an exemplary embodiment, an execution main body of the above steps may be a terminal but is not limited thereto.

In an exemplary embodiment, execution sequences of the step S402, the step S404 and the step S406 may be interchangeable, for example, the step S404 may be executed first, and then the step S402 is executed.

This embodiment is illustrated below in combination with specific examples.

Figure 5:
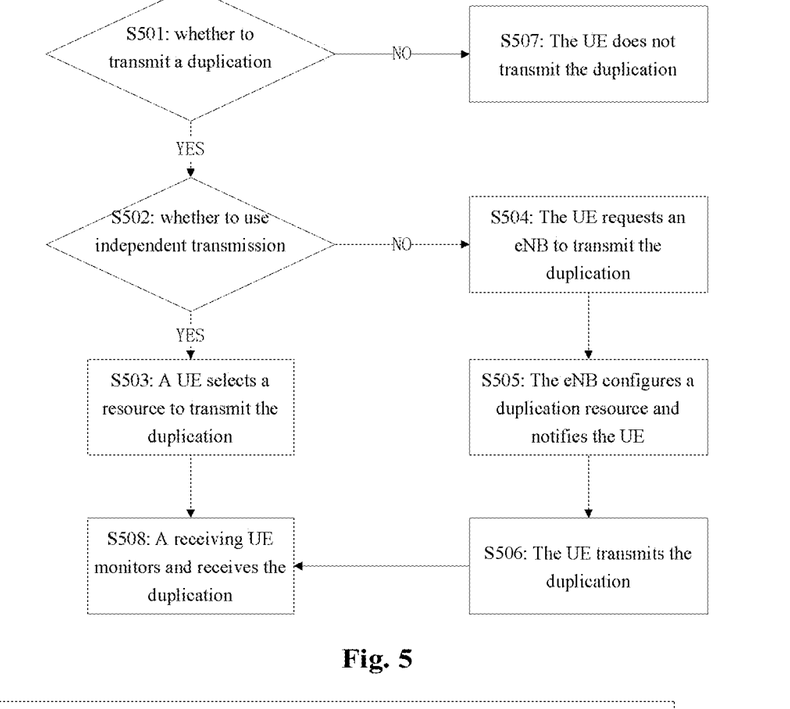
FIG. 5 is a flowchart of an information transmission method according to some embodiments of the present disclosure.

In an exemplary embodiment, the application scenario of the above information transmission method includes but not limited to: a V2X application that may be applied to a V2X of 4G and 5G networks. When a PC5 transmits a V2X service duplication by using multiple carriers, as shown in FIG. 5, the following steps are included.

At S501: a UE determines whether to transmit a V2X service duplication; if yes, step S502 is executed; otherwise, step S507 is executed.

An application layer of the UE generates V2X service data; the application layer transmits the V2X service data, a frequency corresponding to a V2X service, a Prose Per Packet Priority (PPPP) of the V2X service, a Prose Per Packet Reliability (PPPR) of the V2X service and the like to an access layer such as a PDCP layer) of the UE; and the access layer of the UE determines whether to use a transmission manner of the duplication according one or more types of the above information, a measured CBR of the PC5 frequency, a reliability threshold and the like, for example: the V2X service has a high priority (for instance, greater than a pre-defined threshold), a high reliability requirement (for instance, greater than a pre-defined threshold) and a low CBR for part or all of PC5 carrier frequencies (for instance, lower than a pre-defined threshold), it is determined that the above UE may use the duplication for transmission; or otherwise, the UE does not use the duplication for transmission. The pre-defined threshold is indicated by RRC signaling, or pre-configured in the UE.

It is to be noted that for a UE using an eNB scheduling PC5 resource manner, upon the determination that the duplication needs to be transmitted, the UE is necessary to indicate the eNB of a duplication transmitting request message; and then the eNB determines whether the UE activates the duplication for transmission.

At S502: the UE determines whether to use an independent selecting transmission manner; if yes, step S503 is executed; or otherwise, step S504 is executed.

If the UE is located in a coverage of the eNB, one of the following transmission manners is selected according to an indication of the eNB: the independent selecting transmission manner, and the eNB scheduling transmission manner; and if the UE is located out of the coverage of the eNB, the independent selecting manner is used.

The UE determines whether it is located in the coverage of the eNB according to a measured reference signal strength. If the measured reference signal strength is lower than a threshold, it is determined that the UE is located out of the coverage of the eNB; or otherwise, it is determined that the UE is located in the coverage.

At S503: the UE selects a PC5 carrier for transmitting the duplication and transmits a data duplication on the PC5 carrier.

The above UE uses the independent selecting manner, and first selects the PC5 carrier for transmitting the duplication. The selection is made according to a CBR of a congestion degree of a carrier, for example, the UE independently selects a carrier with a low CBR (lower than a pre-defined threshold) to transmit the duplication; if multiple PC5 carriers have the CBR lower than the pre-defined threshold, the UE selects a carrier with a lowest or highest CBR in the PC5 carriers; and if CBRs of multiple PC5 carriers are lower than the threshold and the same, the UE selects a PC5 carrier according to a pre-defined rule, for example, the UE selects the PC5 carrier randomly. If the above UE is located out of the coverage of the eNB, the pre-defined threshold and rule are pre-configured in the UE; and if the UE is located in the coverage of the eNB, the pre-defined threshold and rule are indicated by the eNB via Radio Resource Control (RRC) signaling.

In an exemplary embodiment, one of the following parameters are further taken into consideration: a PPPP of a V2X service, a carrier corresponding to the V2X service, a PPPR of the service, a priority of a carrier, a capability of a UE, and a pre-defined rule. For example, the UE first selects a duplication carrier for a V2X service having a high priority, and/or first selects a duplication carrier for a V2X service having a high PPPR, and/or selects a PC5 carrier having a high/low PPPP (with a view to that an importance of the duplication is lower than that of an original, the priority of the duplication carrier may be lower than that of the original), and/or the UE selects the PC5 carrier according to an own transmission capability (such as a maximum transmission power and the number of transmission modules of the UE), and/or the UE selects the PC5 carrier according to the pre-defined rule (such as the number of pre-configured PC5 carriers, a carrier intensity and a reliability threshold). The above parameters may be indicated by an upper level (the PPPP, the PPPR and the carrier corresponding to the V2X service), configured by the eNB (the priority of the carrier and the reliability threshold) or pre-configured (the capability of the UE, the number of pre-configured PC5 carriers, and the carrier intensity).

On the selected carrier, the UE selects, by sensing, a time frequency resource for transmitting the data duplication.

For the UE located in the coverage of the eNB, if the UE cannot select an appropriate PC5 carrier for transmitting the duplication, the UE may transmit a request message to the eNB; and the eNB determines, according to the request and a CBR status of a carrier, the PC5 carrier and notifies the UE. In an exemplary embodiment, the eNB may:

Re-configure the pre-defined threshold such as the CBR, the PPPR or a resource pool selection threshold, and notify the UE of a re-configured threshold value; and the UE selects the duplication carrier according to the new threshold.

In an exemplary embodiment, the eNB directly activates the duplication carrier and notifies the UE; and further, the eNB may further re-configure a PC5 resource pool (the UE selects a duplication resource independently in the resource pool) or directly configures the duplication resource and notifies the UE.

After activating the duplication carrier and selecting the duplication resource, the UE transmits the duplication data on a corresponding carrier resource.

If the UE is in the coverage of the NB, when the duplication is transmitted completely, the UE notifies the eNB and the eNB may deactivate a PC5 carrier corresponding to the duplication.

It is to be noted that an original carrier keeps synchronization and time alignment with the duplication carrier (that is, a same synchronous source is used); and moreover, resource awareness and selection operation in the original carrier and the duplication carrier keep independent, that is, a resource selected in the duplication carrier may be different from a resource selected in the original wilier.

At S504: the UE transmits indication information to the eNB, for example, the UE requests the eNB to transmit indication information of the duplication.

The UE transmits the indication information to the eNB via RRC signaling or MAC Control Element (CE) signaling, the indication information including one of the followings: a capability of the UE, a PPPP of a service, a PPPR of the service, a frequency corresponding to the V2X service, CBR, etc.

In an exemplary embodiment, the UE using the eNB scheduling manner further needs to indicate the eNB of a size of the duplication; and while indicating the size, the UE identifies the data as the duplication data. The identifier is statically or dynamically configured.

At S505: the eNB selects a PC5 carrier for transmitting the duplication, and transmits configuration information to the UE, for example, the eNB configures the duplication resource to notify the UE.

The eNB determines the duplication for transmission according to the indication information received in the step S504, selects the PC5 carrier for transmitting the duplication, and configures a resource for transmitting the duplication on the PC5 carrier. If the eNB determines not to activate the duplication for transmission, the eNB transmits indication information to the UE: a duplication transmission rejected request.

The eNB transmits the duplication configuration information or the duplication transmission rejected request of the PC5 carrier to the UE via the RRC signaling.

Upon the reception of the duplication configuration information, the UE continues to execute step S506, or otherwise, goes to step S507.

At S506: the UE transmits the data duplication on the PC5 carrier according to the duplication configuration information.

If the UE supports simultaneous transmission on two PC5 carriers (for example, the UE has a double-transmission module), the UE respectively and simultaneously transmits original and duplication data on the two PC5 carriers. If the UE does not support the simultaneous transmission on two PC5 carriers (for example, the UE has a single transmission module or is limited in maximum transmission power), the UE transmits the original and the duplication on the two carriers in a time division manner (that is, at different transmission moments).

At S507: the UE does not transmit the data duplication.

When the UE does not need to transmit the duplication data or the eNB rejects the duplication transmission request, the UE does not transmit the data duplication.

At S508: a receiving UE monitors the PC5 carrier to obtain V2X service data.

The receiving UE monitors a PC5 carrier corresponding to a V2X service of interest. In view of a special identifier of the duplication data, the receiving UE determines according to the identifier that the received data is the duplication data. If an access layer of the receiving UE cannot determine whether the received data is the duplication, it may be determined by an application layer of the UE; and the UE merges the received original and duplication data to obtain required V2X service data.

In an implementation manner of an exemplary embodiment, the transmission manner includes at least one of the followings: a first transmission manner and a second transmission manner. The first transmission manner is a manner in which the UE independently selects a transmission resource, and the second transmission manner is a manner in which the eNB schedules a resource for the UE.

In an exemplary embodiment, when the transmission manner is the first transmission manner, the step that a PC5 air interface carrier for transmitting the V2X service duplication is selected according to a rule corresponding to the transmission manner includes the following steps:

At S11, the PC5 air interface carrier for transmitting the V2X service duplication is selected according to at least one of the following parameters: a congestion degree of the PC5 air interface carrier, a PPPP corresponding to a V2X service, the number of carriers corresponding to the V2X service, a PPPR of the V2X service, a priority of a PC5 carrier, and a capability of a UE.

In an exemplary embodiment, when the transmission manner is the second transmission manner, the step that a PC5 air interface carrier for transmitting the V2X service duplication is selected according to a rule corresponding to the transmission manner includes the following steps.

At S21, first indication information is transmitted to the eNB, the first indication information being used for instructing the eNB to schedule the PC5 air interface carrier for transmitting the V2X service duplication for the UE; scheduling indication information transmitted by the eNB is received; and the PC5 air interface carrier for transmitting the V2X service duplication is selected according to the scheduling indication information.

In an exemplary embodiment, the step that a transmission manner of a V2X service duplication to be transmitted is determined includes the following steps.

At S31, the transmission manner of the V2X service duplication to be transmitted is determined according to a position where a transmitting UE is located, the position where the transmitting UE is located including: the transmitting UE is located in a coverage of an eNB, and the transmitting UE is located out of the coverage of the eNB; when the transmitting UE is located out of the coverage of the eNB, the transmission manner is a manner in which the UE independently selects a transmission resource; and when the transmitting UE is located in the coverage of the eNB, a manner in which the eNB schedules or the UE independently selects the transmission resource is determined according to a local policy.

It is to be noted that the local policy is provided by an operator or a service provider, and may be indicated or pre-configured in the UE via the eNB.

In an implementation manner of an exemplary embodiment, after the V2X service duplication is transmitted on the selected PC5 air interface carrier, the method further includes the following steps:

At S41, a second indication message is transmitted to the eNB, the second indication message being used for instructing the eNB to deactivate the PC5 air interface carrier for transmitting the V2X service duplication.

Figure 6:
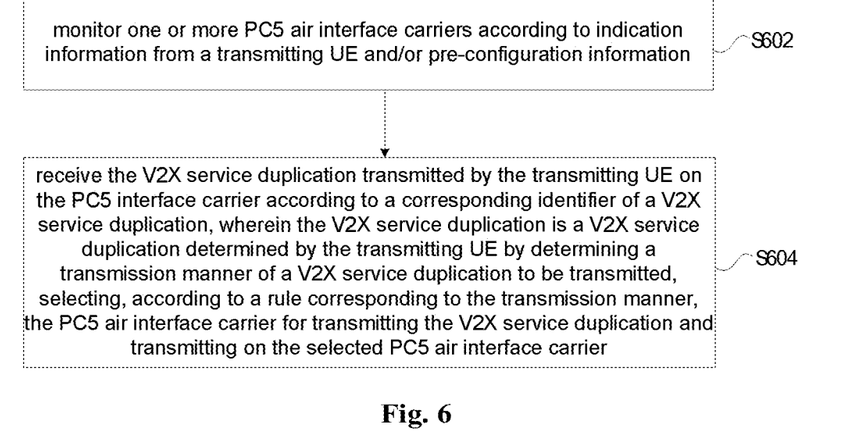
FIG. 6 is a flowchart of an information reception method according to an embodiment of the present disclosure.

This embodiment further provides an information reception method. FIG. 6 is a flowchart of an information reception method according to an embodiment of the present disclosure. As shown in FIG. 6, the process includes the following steps.

At S602, one or more PC5 air interface carriers are monitored according to indication information and/or pre-configuration information of a transmitting UE.

At S604, according to a corresponding identifier of a V2X service duplication, the V2X service duplication transmitted by the transmitting UE is received on the PC5 interface carrier.

The V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier.

In an exemplary embodiment, an application scenario of the above information reception method includes but not limited to: a V2X of an LTE network, a V2X of a 4G network, and a V2X of a 5G network. In this application scenario, one or more PC5 air interface carriers are monitored according to indication information and/or pre-configuration information of a transmitting UE; and according to a corresponding identifier of a V2X service duplication, the V2X service duplication transmitted by the transmitting UE is received on the PC5 interface carrier, wherein the V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier. In other words, a transmitting UE selects, according to a rule corresponding to a transmission manner, a PC5 air interface carrier for transmitting a V2X service duplication and transmits; and by receiving the V2X service duplication on the selected PC5 air interface carrier, a technical problem on how to select a PC5 carrier for transmitting a duplication is not proposed in the relevant art is solved, and the reliability of V2X service information of a PC5 interface is improved.

In an exemplary embodiment, the execution entity of the above steps may be a terminal but is not limited thereto.

In an exemplary embodiment, execution sequences of the step S602, the step S604 and the step S606 may be interchangeable, for example, the step S604 may be executed first, and then the step S602 is executed.

In an implementation manner of an exemplary embodiment, the above method further includes the following steps:

At S51, a V2X service original and a V2X service duplication transmitted by the transmitting UE are merged to obtain an integral V2X service.

This embodiment is illustrated below in combination with specific examples.

Figure 7:
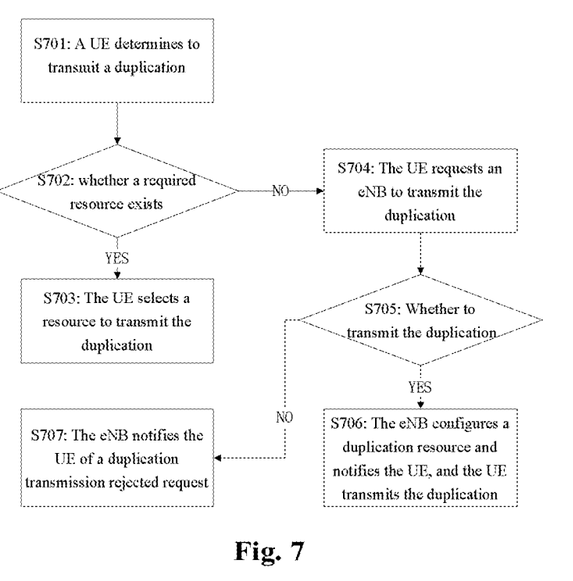
FIG. 7 is a flowchart (1) of an information transmission method according to some embodiments of the present disclosure.

In an exemplary embodiment, the application scenario of the information transmission method includes: a UE independently selects a duplication resource within the coverage of an eNB. As shown in FIG. 7, the following steps are included.

At S701: a UE determines a V2X service duplication in need of being transmitted.

Similar to the above step S501, the UE determines, according to a PPPR of a V2X service, a reliability threshold, a CBR of a PC5 carrier, a priority of the V2X service and other information, that duplication transmission is needed.

At S702: the UE determines whether a required resource exists; if yes, step S703 is executed; or otherwise, step S704 is executed.

The UE selects a duplication carrier and a resource according to a pre-configured parameter. If the required resource cannot be selected (for example, a transmission power of the UE is limited) or the resource cannot meet a requirement (for example, the CBR is high), the UE sends a request message to the eNB.

It is to be noted that the resource includes a PC5 carrier and a resource (time frequency resource) on the PC5 carrier. In a case where the resource in any one part or two parts does not meet the requirement, it is considered that the UE does not have the required resource.

At S703: the UE selects a PC5 carrier and a resource for transmitting the duplication and transmits duplication data on the selected resource.

Similar to the above step S503, the UE selects a duplication carrier according to a PPPP of a V2X service, a PPPR, a CBR of a carrier, a pre-defined rule and the like, selects a resource on the duplication carrier, and transmits a V2X service duplication on the selected resource.

At S704, the UE indicates a duplication transmission request to an eNB.

The UE indicates a duplication transmission request message to the eNB via RRC signaling or MAC CE signaling, the request message at least including: a reliability indication (such as a PPPR) of the V2X service, and further including one or more of the followings: a priority of the V2X service, and a carrier frequency corresponding to the V2X service.

At S705: the eNB determines whether a duplication may be transmitted; if yes, step S706 is executed; or otherwise, step S707 is executed.

The eNB determines, according to one or more of the followings, whether the UE may transmit the duplication: a priority of a V2X service, a CBR state of a carrier, a PPPR of the V2X service and a pre-defined rule. For example, in a case where the V2X service has a high priority, and/or the CBR of the carrier is low, and/or the V2X service has a high PPPR, and/or the pre-defined rule meets a duplication request of the UE, the eNB determines that the UE may transmit the duplication.

At S706, the eNB configures a duplication resource and notifies the UE, and UE transmits duplication data.

If the transmission power of the UE is limited, the eNB may re-configure the transmission power of the UE on different carriers; and if a pre-defined threshold is problematic, the eNB may re-configure the pre-defined threshold.

In an exemplary embodiment, the eNB may:

1) re-configure the pre-defined threshold or a power control parameter such as a CBR, a PPPR or a resource pool selection threshold, and notify the UE of a re-configured parameter; and the UE selects the duplication carrier according to the new parameter; or 2) the eNB directly activates the duplication carrier and notifies the UE; and further, the eNB may further re-configure a PC5 resource pool (the UE selects a duplication resource independently in the resource pool) or directly configures the duplication resource and notifies the UE.

The UE transmits the duplication data on the duplication carrier.

At S707, the eNB indicates a duplication transmission rejected request to the UE.

Upon the determination that a requirement of the UE to transmit the duplication cannot be met, the eNB transmits a duplication transmission request rejected message to the UE. In an exemplary embodiment, the rejected message includes a rejected reason.

In the present embodiment, the application scenario of the information transmission method includes but not limited to: a UE out of the coverage of an eNB selects a duplication resource independently.

Figure 8:
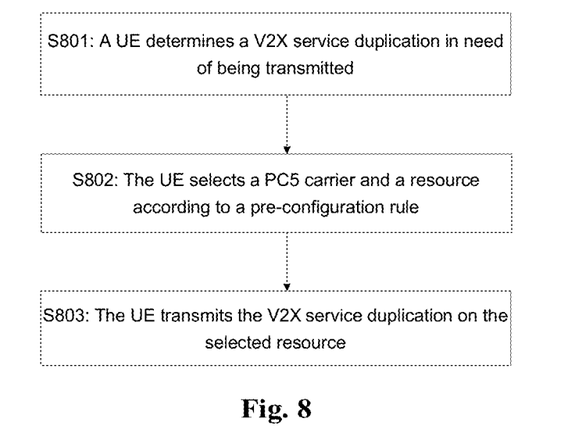
FIG. 8 is a flowchart (2) of an information transmission method according to some embodiments of the present disclosure.

As shown in FIG. 8, the following steps are included.

At S801, a UE determines a V2X service duplication in need of being transmitted.

Similar to the step S701, this step is not elaborated herein.

At S802, the UE selects a PC5 carrier and a resource according to a pre-configuration rule.

Similar to the above step S503, the UE selects a duplication carrier according to the PPPP of the V2X service, the PPPR of the V2X service, a CBR of a carrier, or a pre-defined rule and the like, and selects a resource independently on the duplication carrier.

At S803, the UE transmits the V2X service duplication on the selected resource.

The UE transmits the V2X service duplication on the selected resource.

In this embodiment, the application scenario of the information transmission method includes but not limited to: a manner in which an eNB schedules a duplication resource.

Figure 9:
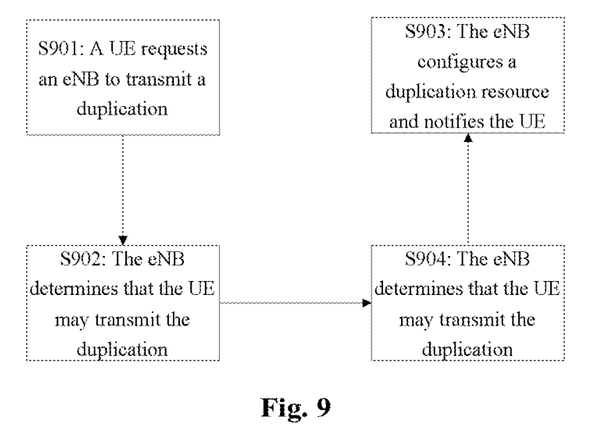
FIG. 9 is a flowchart (3) of an information transmission method according to some embodiments of the present disclosure.

As shown in FIG. 9, the following steps are included.

At S901, a UE transmits a duplication request message to an eNB.

The UE first determines that a V2X service duplication needs to be transmitted, which may be referred to the description in the step S501 specifically.

Then, the UE indicates a duplication transmission request message to the eNB via RRC signaling or MAC CE signaling, the request message at least including: a reliability indication (such as a PPPR) of the V2X service, and further including one or more of the followings: a priority of the V2X service, and a carrier frequency corresponding to the V2X service.

At S902: the eNB determines that the UE may transmit a duplication.

The eNB determines, according to one or more of the followings, whether the UE may transmit the duplication: a priority of a V2X service, a CBR state of a carrier, a PPPR of the V2X service and a pre-defined rule. For example, in a case where the V2X service has a high priority, and/or the CBR of the carrier is low, and/or the V2X service has a high PPPR, and/or the pre-defined rule meets a duplication request of the UE, the eNB determines that the UE may transmit the duplication.

At S903, the eNB configures a PC5 carrier and a resource for transmitting the duplication, and notifies the UE.

The eNB configures a duplication carrier and a resource on the carrier, and notifies the UE via RRC signaling.

At S904, the UE transmits the V2X service duplication on the PC5 carrier.

The UE transmits V2X service duplication data on the PC5 duplication carrier.

In this embodiment, the application scenario of the information transmission method includes but not limited to: a receiving UE receives duplication data.

Figure 10:
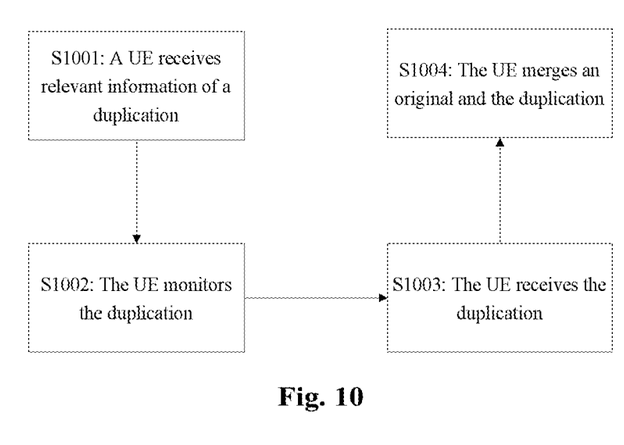
FIG. 10 is a flowchart (4) of an information transmission method according to some embodiments of the present disclosure.

As shown in FIG. 10, the following steps are included.

At S1001, a UE obtains relevant information of the V2X service duplication.

The obtained information includes one of the followings: eNB indication information, proximity UE indication information, and pre-configuration information. The relevant information of the duplication includes one or more of the followings: a duplication carrier, and a duplication identifier. The duplication carrier refers to a PC5 carrier capable of providing duplication transmission and corresponding to a received V2X service of interest of the UE, and may include multiple carriers. The duplication identifier is used for indicating that a data packet is the duplication. The duplication identifier may be configured statically or dynamically. The static configuration refers to that the duplication identifier in one-to-one correspondence with an original identifier is specified in advance. The dynamic configuration refers to that an eNB or a transmitting UE configures the duplication identifier and notifies the duplication identifier to other UEs.

At S1002, the UE monitors the duplication on a PC5 carrier.

The UE monitors the duplication identifier on a duplication carrier. If the UE has a limited receiving capability, for example, the number of reception modules is smaller than that of carriers in need of being monitored, the UE monitors on different carriers by using a time division manner. It is to be noted that the time division manner may miss required duplication data.

At S1003, the UE obtains the V2X service duplication.

In response to monitoring a duplication identifier of a V2X service of interest, the UE receives duplication data.

At S1004, the UE merges original and duplication data to obtain a required V2X service.

The UE merges the received original and duplication data to obtain the required V2X service.

In this embodiment, the application scenario of the information transmission method includes but not limited to: duplication data is transmitted completely.

Figure 11:
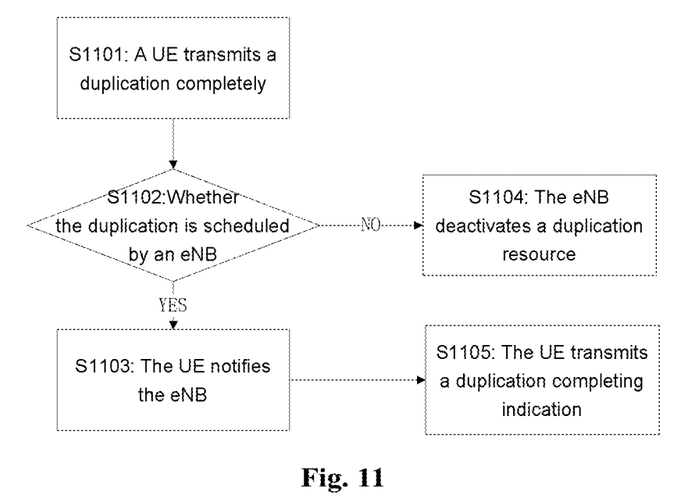
FIG. 11 is a flowchart (5) of an information transmission method according to some embodiments of the present disclosure.

As shown in FIG. 11, the following steps are included.

At S1101, the UE completed the transmission of a service duplication, for example, the UE finished the transmission of a V2X service duplication.

The cache data of the V2X service duplication is transmitted completely, which indicates that the duplication is transmitted completely.

At S1102: whether a duplication resource is scheduled by an eNB; if yes, step S1103 is executed; or otherwise, step S1105 is executed.

The UE determines whether the duplication resource is scheduled by the eNB according to a duplication resource configuration manner.

At S1103: the UE notifies the eNB, for example, the UE transmits duplication completing indication information to the eNB.

In case of an eNB scheduling manner, the duplication resource of the UE is configured by the eNB. The above resource scheduling cannot be used in other services since when the duplication data of the UE is transmitted completely, the eNB does not know this. In order to improve a resource utilization rate, the UE transmits the duplication completing indication information to the eNB via RRC signaling or MAC CE signaling.

At S1104, the eNB deactivates a duplication carrier and a resource.

Upon the reception of the indication, the eNB deactivates the duplication carrier and the resource. The deactivation refers to that the carrier and the resource may be used in other services.

At S1105: the UE sends duplication transmission completing indication information.

The UE uses a manner in which the UE selects a resource independently. The UE may transmit the duplication transmission completing indication information to an adjacent UE via a PC5; and upon the reception of the indication information, the proximity UE may stop to monitor the duplication on the duplication carrier.

By means of the above-mentioned descriptions on the implementation manner, the person skilled in the art may clearly understand that the present disclosure may be implemented by software plus a necessary universal hardware platform, and may also be implemented by hardware, but under most conditions, the former is a better implementation manner. Based on such an understanding, the technical solutions of the present disclosure substantially or parts making contributions to the conventional art may be embodied in form of software product, and the computer software product is stored in a storage medium (such as an ROM/RAM, a magnetic disk and an optical disc), including a plurality of instructions configured to enable a terminal device (which may be a mobile phone, a computer, a server, network equipment or the like) to execute the method in each embodiment of the present disclosure.

This embodiment further provides an information transmission apparatus for implementing the above-mentioned embodiments and preferred implementation manners. A content that has been described will no longer be repeated. As used below, the term "module" may implement a combination of software and/or hardware having a predetermined function. Although the device described in the following embodiments is implemented by software preferably, the implementation of hardware or a combination of the software and the hardware may also be conceivable.

Figure 12:
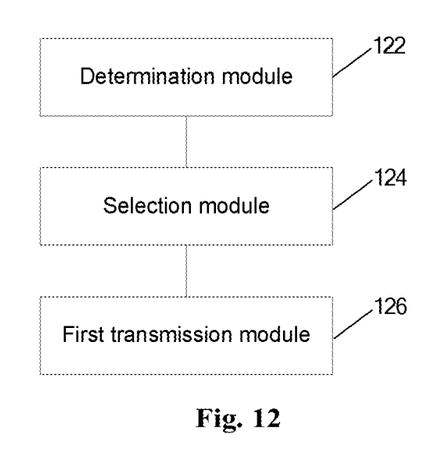
FIG. 12 is a structural block diagram of an information transmission apparatus according to an embodiment of the present disclosure.

FIG. 12 is a structural block diagram of an information transmission apparatus according to an embodiment of the present disclosure. As shown in FIG. 12, the apparatus includes: a determination module 122, a selection module 124 and a first transmission module 126.

1) The determination module 122 is configured to determine a transmission manner of a V2X service duplication to be transmitted.

2) The selection module 124 is configured to select a PC5 air interface carrier for transmitting the V2X service duplication according to a rule corresponding to the transmission manner.

3) The first transmission module 126 is configured to transmit the V2X service duplication on the selected PC5 air interface carrier.

In an exemplary embodiment and in this embodiment, an application scenario of the above information transmission apparatus includes but not limited to: a V2X of an LTE network, a V2X of a 4G network, and a V2X of a 5G network. In this application scenario, a transmission manner of a V2X service duplication to be transmitted is determined; a PC5 air interface carrier for transmitting the V2X service duplication is selected according to a rule corresponding to the transmission manner; and the V2X service duplication is transmitted on the selected PC5 air interface carrier. In other words, the PC5 air interface carrier for transmitting the V2X service duplication is selected according to the rule corresponding to the transmission manner; and thus, a technical problem on how to select a PC5 carrier for transmitting a duplication is not proposed in the relevant art is solved, and the reliability of V2X service information of a PC5 interface is improved.

In an implementation manner, the transmission manner includes at least one of the followings: a first transmission manner and a second transmission manner. The first transmission manner is a manner in which a UE independently selects a transmission resource, and the second transmission manner is a manner in which an eNB schedules a resource for the UE.

In an exemplary embodiment, when the transmission manner is the first transmission manner, the selection module 124 is further configured to select the PC5 air interface carrier for transmitting the V2X service duplication according to at least one of the following parameters: a congestion degree of the PC5 air interface carder, a PPPP corresponding to a V2X service, the number of carriers corresponding to the V2X service, a PPPR of the V2X service, a priority of a PC5 carrier, and a capability of a UE.

Figure 13:
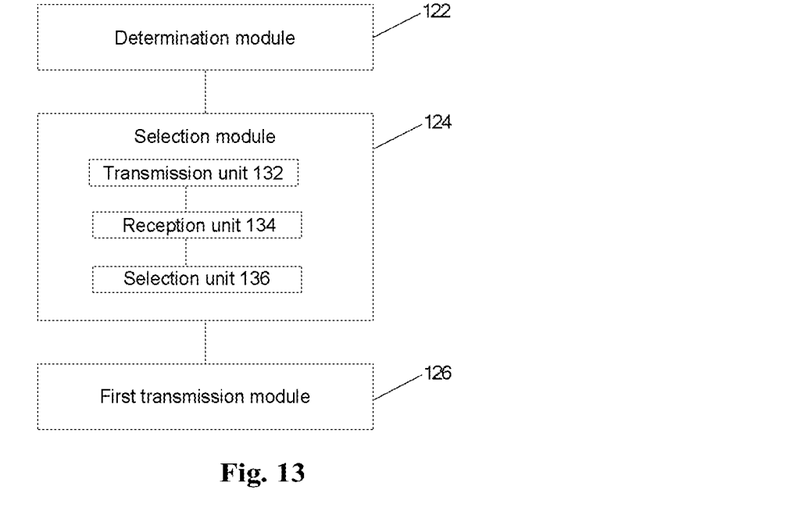
FIG. 13 is a structural block diagram (1) of an information transmission apparatus according to an embodiment of the present disclosure.

FIG. 13 is a structural block diagram (1) of an information transmission apparatus according to an embodiment of the present disclosure. As shown in FIG. 13, the selection module 124 includes: a transmission unit 132, a reception unit 134 and a selection unit 136.

1) The transmission unit 132 is configured to transmit first indication information to an eNB, the first indication information being used for instructing the eNB to schedule the PC5 air interface carrier for transmitting the V2X service duplication for the UE.

2) The reception unit 134 is configured to receive scheduling indication information transmitted by the eNB.

3) The selection unit 136 is configured to select the PC5 air interface carrier for transmitting the V2X service duplication according to the scheduling indication information.

In an exemplary embodiment, the determination module 122 is further configured to determine, according to a position where a transmitting UE is located, the transmission manner of the V2X service duplication to be transmitted, the position where the transmitting UE is located including: the transmitting UE is located in a coverage of the eNB, and the transmitting UE is located out of the coverage of the eNB, when the transmitting UE is located out of the coverage of the eNB, the transmission manner is a manner in which the UE independently selects a transmission resource; and when the transmitting UE is located in the coverage of the eNB, a manner in which the eNB schedules or the UE independently selects the transmission resource is determined according to a local policy.

Figure 14:
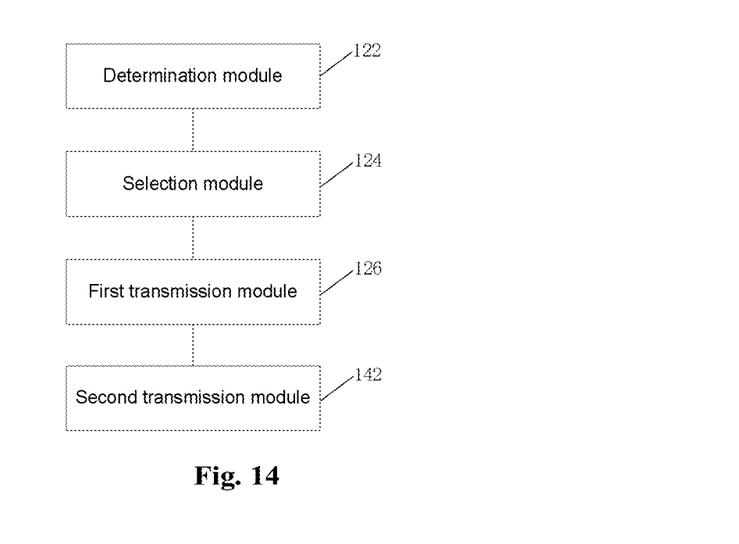
FIG. 14 is a structural block diagram (2) of an information transmission apparatus according to an embodiment of the present disclosure.

FIG. 14 is a structural block diagram (2) of an information transmission apparatus according to an embodiment of the present disclosure. As shown in FIG. 14, except for the modules shown in FIG. 12, the apparatus further includes: a second transmission module 142.

1) The second transmission module 142 is configured to transmit a second indication message to an eNB after transmitting a V2X service duplication on a selected PC5 air interface carrier, the second indication message being used for instructing the eNB to deactivate the PC5 air interface carrier for transmitting the V2X service duplication.

Figure 15:
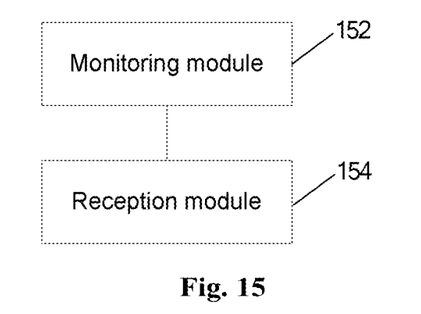
FIG. 15 is a structural block diagram of an information reception apparatus according to an embodiment of the present disclosure.

This embodiment further provides an information reception apparatus. FIG. 15 is a structural block diagram of an information reception apparatus according to an embodiment of the present disclosure. As shown in FIG. 15, the apparatus includes: a monitoring module 152 and a reception module 154.

1) The monitoring module 152 is configured to monitor one or more PC5 air interface carriers according to indication information and/or pre-configuration information of a transmitting UE.

2) The reception module 154 is configured to receive, according to a corresponding identifier of a V2X service duplication, the V2X service duplication transmitted by the transmitting UE on the PC5 interface carrier.

The V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier.

In this embodiment, an application scenario of the above information reception apparatus includes but not limited to: a V2X of an LTE network, a V2X of a 4G network, and a V2X of a 5G network. In this application scenario, one or more PC5 air interface carriers are monitored according to indication information and/or pre-configuration information of a transmitting UE; and according to a corresponding identifier of a V2X service duplication, the V2X service duplication transmitted by the transmitting UE is received on the PC5 interface carrier, wherein the V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier. In other words, a transmitting UE selects, according to a rule corresponding to a transmission manner, a PC5 air interface carrier for transmitting a V2X service duplication and transmits; and by receiving the V2X service duplication on the selected PC5 air interface carrier, a technical problem on how to select a PC5 carrier for transmitting a duplication is not proposed in the relevant art is solved, and the reliability of V2X service information of a PC5 interface is improved.

Figure 16:
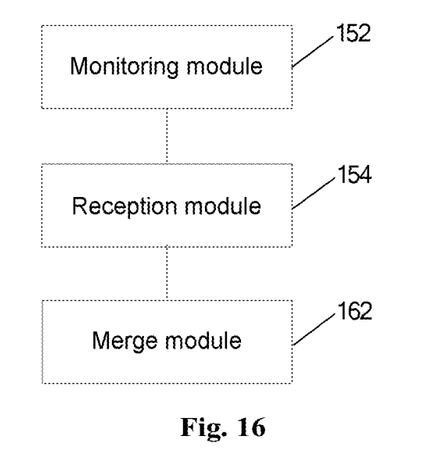
FIG. 16 is a structural block diagram (1) of an information reception apparatus according to an embodiment of the present disclosure.

FIG. 16 is a structural block diagram (1) of an information reception apparatus according to an embodiment of the present disclosure. As shown in FIG. 16, except for the modules shown in FIG. 15, the apparatus further includes: a merge module 162.

1) The merge module 162 is configured to merge a V2X service original and a V2X service duplication transmitted by the transmitting UE to obtain an integral V2X service.

It is to be noted that each module may be implemented by software or hardware. The later may be implemented via the following manner but is not limited thereto: the above modules are located in the same processor; or the above modules are respectively located in different processors in any combined form.

An embodiment of the present disclosure further provides a storage medium; the storage medium stores a computer program; and the computer program is configured to execute, when running, the steps of any of the above-mentioned method embodiments.

In an exemplary embodiment, the storage medium may be configured to store a computer program for further executing the following steps:

At S1, a transmission manner of a V2X service duplication to be transmitted is determined.

At S2, a PC5 air interface carrier for transmitting the V2X service duplication is selected according to a rule corresponding to the transmission manner.

At S3, the V2X service duplication is transmitted on the selected PC5 air interface carrier.

In an exemplary embodiment, the storage medium is further configured to store a computer program for executing the following steps:

At S1, one or more PC5 air interface carriers are monitored according to indication information and/or pre-configuration information of a transmitting UE.

At S2, according to a corresponding identifier of a V2X service duplication, the V2X service duplication transmitted by the transmitting UE is received on the PC5 interface carrier.

In an exemplary embodiment, the storage medium may include but not limited to: various media capable of storing a computer program such as a U disk, an ROM, an RAM, a mobile hard disk, a magnetic disk or an optical disc.

An embodiment of the present disclosure further provides an electronic apparatus, which includes a memory and a processor; the memory stores a computer program; and the processor is configured to run the computer program to execute the steps of any of the above-mentioned method embodiments.

In an exemplary embodiment, the electronic apparatus may further include a transmission device and an input-output device; the transmission device is connected to the processor; and the input-output device is connected to the processor.

In an exemplary embodiment, the processor may be configured to execute the following steps via a computer program:

At S1, a transmission manner of a V2X service duplication to be transmitted is determined.

At S2, a PC5 air interface carrier for transmitting the V2X service duplication is selected according to a rule corresponding to the transmission manner.

At S3, the V2X service duplication is transmitted on the selected PC5 air interface carrier.

In an exemplary embodiment, the processor is further configured to store a computer program for executing the following steps:

At S1, one or more PC5 air interface carriers are monitored according to indication information and/or pre-configuration information of a transmitting UE.

At S2, according to a corresponding identifier of a V2X service duplication, the V2X service duplication transmitted by the transmitting UE is received on the PC5 interface carrier.

In an exemplary embodiment, the specific example in this embodiment may be referred to the examples described in the above embodiments and optional implementation manners, and will no longer be repeated herein.

Obviously, those skilled in the art should understand that the modules or steps of the present disclosure may be implemented by a general-purpose computing device and centralized in a single computing device or distributed over a network consisting of a plurality of computing devices. Optionally, they may be implemented by a program code executable by a computing device, so that they may be stored in a storage device and executed by the computing device. Moreover, they may be different from the steps illustrated or described herein in some cases, or implemented by respectively fabricating them into respective integrated circuit modules or by fabricating a plurality of modules or steps of them into a single integrated circuit module. By doing so, the present disclosure is not limited to any specific combination of hardware and software.

The above are only preferred embodiments of the present disclosure and should not be used for limiting the present disclosure. For the person skilled in the art, the present disclosure may have various modifications and changes. Any modifications, equivalent replacements, improvements and the like within the principle of the present disclosure shall fall within the scope of protection of the present disclosure.

What is claimed is:

1. An information transmission method, comprising:
   determining, by a access layer of a User Equipment (UE), whether to use duplication transmission according to a Prose Per Packet Reliability (PPPR) of a V2X service and a reliability threshold, wherein the reliability threshold is indicated by RRC signaling, or pre-configured in the UE;
   when the UE determine to use the duplication transmission, determining a transmission manner of a Vehicle to everything (V2X) service duplication to be transmitted;
   selecting a PC5 air interface carrier for transmitting the V2X service duplication according to a rule corresponding to the transmission manner; and
   transmitting the V2X service duplication on the selected PC5 air interface carrier, wherein the V2X service duplication is indicated by a specific logical channel identifier;
   wherein the determining a transmission manner of a V2X service duplication to be transmitted comprises:
   determining the transmission manner of the V2X service duplication to be transmitted according to a position where a transmitting UE is located;
   the position where the transmitting UE is located comprises: the transmitting UE is located in a coverage of the eNB, and the transmitting UE is located out of the coverage of the eNB;
   when the transmitting UE is located out of the coverage of the eNB, the transmission manner is a manner in which the UE independently selects a transmission resource; and
   when the transmitting UE is located in the coverage of the eNB, a manner in which the eNB schedules or the UE independently selects the transmission resource is determined according to a local policy.

2. The method as claimed in claim 1, wherein
   the transmission manner comprises at least one of the followings: a first transmission manner and a second transmission manner; the first transmission manner is a manner in which User Equipment (UE) independently selects a transmission resource, and the second transmission manner is a manner in which an eNB schedules a resource for the UE.

3. The method as claimed in claim 2, wherein when the transmission manner is the first transmission manner, selecting a PC5 air interface carrier for transmitting the V2X service duplication according to a rule corresponding to the transmission manner comprises:
   selecting the PC5 air interface carrier for transmitting the V2X service duplication according to at least one of the following parameters:
   a congestion degree of the PC5 air interface carrier, a Prose Per Packet Priority (PPPP) corresponding to a V2X service, number of carriers corresponding to the V2X service, a Prose Per Packet Reliability (PPPR) of the V2X service, a priority of a PC5 carrier, and a UE capability.

4. The method as claimed in claim 2, wherein when the transmission manner is the second transmission manner, the selecting a PC5 air interface carrier for transmitting the V2X service duplication according to a rule corresponding to the transmission manner comprises:
   transmitting first indication information to the eNB, the first indication information being used for instructing the eNB to schedule the PC5 air interface carrier for transmitting the V2X service duplication for the UE;
   receiving scheduling indication information transmitted by the eNB; and
   selecting, according to the scheduling indication information, the PC5 air interface carrier for transmitting the V2X service duplication.

5. The method as claimed in claim 1, wherein after transmitting the V2X service duplication on the selected PC5 air interface carrier, the method further comprises:
   transmitting second indication information to the eNB, the second indication information being used for instructing the eNB to deactivate the PC5 air interface carrier for transmitting the V2X service duplication.

6. A non-transitory storage medium, storing a computer program, wherein the computer program is configured to execute, when running, the method as claimed in claim 1.

7. An electronic apparatus, comprising a memory and a processor, wherein the memory stores a computer program, and the processor is configured to run the computer program to execute the method as claimed in claim 1.

8. A non-transitory storage medium, storing a computer program, wherein the computer program is configured to execute, when running, the method as claimed in claim 2.

9. A non-transitory storage medium, storing a computer program, wherein the computer program is configured to execute, when running, the method as claimed in claim 3.

10. An information reception method, comprising:
monitoring one or more PC5 air interface carriers according to indication information from a transmitting User Equipment (UE) and/or pre-configuration information; and
receiving a Vehicle to everything (V2X) service duplication transmitted by the transmitting UE on the PC5 interface carrier according to a corresponding identifier of the V2X service duplication, wherein the V2X service duplication is indicated by a specific logical channel identifier,
wherein the V2X service duplication is a V2X service duplication determined by the transmitting UE by determining a transmission manner of a V2X service duplication to be transmitted, selecting, according to a rule corresponding to the transmission manner, the PC5 air interface carrier for transmitting the V2X service duplication and transmitting on the selected PC5 air interface carrier;
wherein before the V2X service duplication is transmitted by the transmitting UE, determining, by a access layer of the transmitting UE, whether to use duplication transmission according to a Prose Per Packet Reliability (PPPR) of a V2X service and a reliability threshold, wherein the reliability threshold is indicated by RRC signaling, or pre-configured in the transmitting UE;
wherein when the transmitting UE is located out of the coverage of the eNB, the transmission manner is a manner in which the UE independently selects a transmission resource;
and when the transmitting UE is located in the coverage of the eNB, a manner in which the eNB schedules or the UE independently selects the transmission resource is determined according to a local policy.

11. The method as claimed in claim 10, wherein the method further comprises:
merging a V2X service original and a V2X service duplication transmitted by the transmitting UE to obtain an integral V2X service.

12. A non-transitory storage medium, storing a computer program, wherein the computer program is configured to execute, when running, the method as claimed in claim 10.

13. An electronic apparatus, comprising a memory and a processor, wherein the memory stores a computer program, and the processor is configured to run the computer program to execute the method as claimed in claim 10.

14. An information transmission apparatus, applied to a transmitting User Equipment (UE) and comprising:
a access layer of the transmitting UE, configured to determine whether to use duplication transmission according to a Prose Per Packet Reliability (PPPR) of a V2X service and a reliability threshold, wherein the reliability threshold is indicated by RRC signaling, or pre-configured in the transmitting UE;
a determination module, configured to, when the UE determine to use the duplication transmission, determine a transmission manner of a Vehicle to everything (V2X) service duplication to be transmitted;
a selection module, configured to select, according to a rule corresponding to the transmission manner, a PC5 air interface carrier for transmitting the V2X service duplication; and
a first transmission module, configured to transmit the V2X service duplication on the selected PC5 air interface carrier, wherein the V2X service duplication is indicated by a specific logical channel identifier;
wherein the determination module is further configured to determine, according to a position where a transmitting UE is located, the transmission manner of the V2X service duplication to be transmitted;
the position where the transmitting UE is located comprises: the transmitting UE is located in a coverage of the eNB, and the transmitting UE is located out of the coverage of the eNB;
when the transmitting UE is located out of the coverage of the eNB, the transmission manner is a manner in which the UE independently selects a transmission resource; and
when the transmitting UE is located in the coverage of the eNB, a manner in which the eNB schedules or the UE independently selects the transmission resource is determined according to a local policy.

15. The apparatus as claimed in claim 14, wherein
the transmission manner comprises at least one of the followings: a first transmission manner and a second transmission manner; the first transmission manner is a manner in which a UE independently selects a transmission resource, and the second transmission manner is a manner in which an eNB schedules a resource for the UE.

16. The apparatus as claimed in claim 15, wherein when the transmission manner is the first transmission manner, the selection module is further configured to select the PC5 air interface carrier for transmitting the V2X service duplication according to at least one of the following parameters:
a congestion degree of the PC5 air interface carrier, a Prose Per Packet Priority (PPPP) corresponding to a V2X service, number of carriers corresponding to the V2X service, a Prose Per Packet Reliability (PPPR) of the V2X service, a priority of a PC5 carrier, and a UE capability.

17. The apparatus as claimed in claim 15, wherein when the transmission manner is the second transmission manner, the selection module comprises:
a transmission unit, configured to transmit first indication information to the eNB, the first indication information being used for instructing the eNB to schedule the PC5 air interface carrier for transmitting the V2X service duplication for the UE;
a reception unit, configured to receive scheduling indication information transmitted by the eNB; and
a selection unit, configured to select, according to the scheduling indication information, the PC5 air interface carrier for transmitting the V2X service duplication.

18. The apparatus as claimed in claim 14, wherein the apparatus further comprises:
a second transmission module, configured to transmit second indication information to the eNB after transmitting the V2X service duplication on the selected PC5 air interface carrier, the second indication information being used for instructing the eNB to deactivate the PC5 air interface carrier for transmitting the V2X service duplication.

* * * * *